United States Patent [19]

Freeman

[11] 4,124,323
[45] Nov. 7, 1978

[54] COMPOSITE PICTURE FRAME

[76] Inventor: Richard B. Freeman, 1707 Yorktown Dr., Charlottesville, Va. 22901

[21] Appl. No.: 817,436

[22] Filed: Jul. 20, 1977

[51] Int. Cl.$^2$ .................................................. G09F 1/12
[52] U.S. Cl. ..................................... 403/402; 403/295; 40/155
[58] Field of Search ..................... 403/401, 402, 295; 40/155, 156, 152; 160/381

[56] References Cited

U.S. PATENT DOCUMENTS

| | | | |
|---|---|---|---|
| 2,489,477 | 11/1949 | Brecher | 40/156 |
| 3,310,901 | 3/1967 | Sarkisian | 40/156 |
| 3,677,433 | 7/1972 | Collins | 403/401 X |
| 3,965,601 | 6/1976 | Nielson | 403/401 X |

FOREIGN PATENT DOCUMENTS 357,588  11/1961  Switzerland .............................. 403/401

*Primary Examiner*—Andrew V. Kundrat
*Attorney, Agent, or Firm*—Bacon & Thomas

[57] ABSTRACT

Strips of wood for forming picture frames are attached to extruded members of metal or other rigid material provided with undercut channels. The strips and metal members are mitered at their ends and the mitered ends of composite strips are butted together to form a corner of the frame. A conventional L-shaped rigid member extends into both adjacent channels, spanning the miter joint and locks the metal members together to also hold the wood strips in secure abutment and at the proper angle without the use of any fasteners or adhesives in or on the wood itself at the mitered surfaces.

5 Claims, 4 Drawing Figures

COMPOSITE PICTURE FRAME

BACKGROUND OF THE INVENTION

This invention is in the field of framing devices of particular use in framing pictures or the like.

Wood frames for framing pictures, mirrors and the like are desirable but heretofore it has been necessary to provide fastening means, such as screws, nails, glue or the like, at the mitered surfaces, to secure the mitered ends of the wood frame members together. The use of adhesives is somewhat messy and requires clamping of the frame for a period of time whereas the use of nails or screws or other fastening devices presents the risk of splitting or damaging the wood framing members.

It has also been proposed to provide extruded frame sections for forming picture frames having mitered ends and undercut channels in which L-shaped fasteners are positioned and which, by means of set screws, are caused to hold the metal framing members together. Such devices are satisfactory but the frames have been limited to metal frames, which means that there are severe limitations on the decorative features of the frame itself. An example of such prior extruded metal frames is found in the patent to Nielsen U.S. Pat. No. 3,965,601.

SUMMARY OF THE INVENTION

In this application reference to a picture frame is intended to include frames for mirrors, charts and other articles to be displayed or viewed, other than pictures themselves.

In general, the invention comprises an extruded metal member of no particular decorative value in itself but being attached to a length of wooden picture framing, of the desired texture, color shape. Thus, the same metal member may be employed with wooden frame members of diverse shapes and designs. The extruded metal members are mitered at their ends coplanar with mitered surfaces of the wooden members and may be secured together in the manner suggested by the Nielsen patent referred to above.

While reference herein is made to extruded metal members, it is to be understood that members of rigid materials other than metal may be used.

By the present invention it is possible to construct and assemble wooden picture frames wherein the mitered ends of the frame members are in snug surface abutment and are held so without the use of glue or other fasteners in or on the wood itself.

While the description herein will refer to a frame it is to be inderstood that applicant contemplates distribution of his invention in the form of kits of precut framing members although the invention includes continuous lengths of composite material to be cut by the user.

DESCRIPTION OF THE PREFERRED EMBODIMENTS

Figure 1:
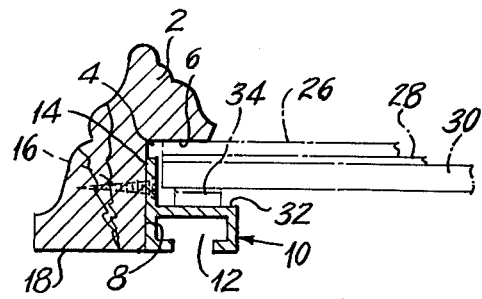
FIG. 1 is a transverse sectional view through a portion of a picture frame embodying the present invention.
Figure 2:
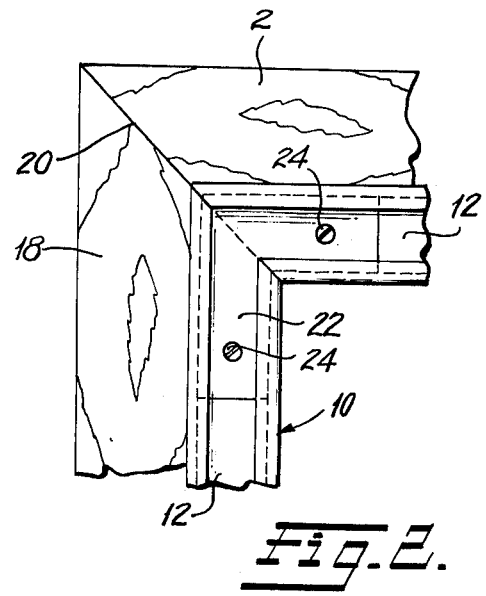
FIG. 2 is a bottom view of the embodiment of FIG. 1 showing adjacent framing members assembled to form a corner of a frame.

In FIGS. 1 and 2, numeral 2 indicates a wood framing member of desired configuration and which is provided with a rabbet 4 in its rear and inner corner region which rabbet defines a first surface 6 facing the rear of the frame and a second surface 8 generally perpendicular to the surface 6. An extruded metal member 10 defines an undercut channel 12 facing the rear of the frame and has an integral flange portion 14. The extruded metal member may be of any suitable material even other than metal, aluminum being commonly used for extrusions of this type. As shown in FIG. 1, one edge of the portion of the extruded member defining the channel 12 and the flange 14 are coplanar and are fixed in abutment with the rabbet surface 8, such as by screws 16 or the like remote from the miter surface of the wood. The undercut channel 12 is positioned to be substantially flush with the rear surface 18 of the wood frame member 2 although it is not essential that they be truly coplanar.

It is contemplated that both the wood member 2 and the extruded member 10 be mitered at their ends to define coplanar end surfaces 20, as seen in FIG. 2. When the ends of the composite strips have been thus mitered, two such strips may be positioned together as shown in FIG. 2 with an L-shaped rigid plate 22 positioned with its legs in the undercut channel, as shown. As is conventional, set screws 24 may be threaded through the plate 22 and manipulated to bind the plate 22 within the undercut channel to lock the frame members together, in the known manner. It is to be noted that the frame may be assembled and clamped together with the mitered surfaces 20 of the wood members in snug abutment to define a neat mitered joint.

When the composite framing members have been cut to size and during assembly to form a frame, the framed elements, which may comprise a protective glass sheet 26 (FIG. 1), a picture or the like 28 and a backing 30, may be positioned against the surface 6 before the frame is completely assembled. It is to be noted that the web portion 32 of the extrusion 10 is spaced from and generally parallel to the surface 6 to thus define a groove in the finished frame for reception of the displayed elements. As is also conventional, a flat spring member 34 may be positioned between the backing 30 and web 32 to hold the displayed members snugly against the surface 6.

Figure 3:
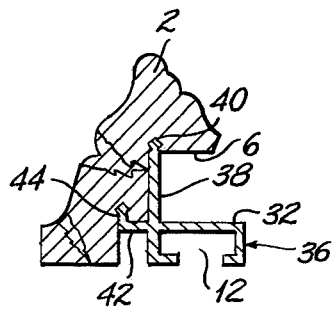
FIGS. 3 and 4 are transverse sectional views through framing members of modified section.

FIG. 3 shows an alternative form of extrusion, identified by numeral 36, which has elements defining the undercut channel 12 and having a web 32, as in FIG. 1. The flange 38, corresponding to the flange 14 of FIG. 1, is not screwed to the wood member 2. Instead, its upper edge is provided with grooves 40 defining an enlarged edge portion which may be forced endwise into a starting groove in the wood member to thus lock the extrusion 36 to the wood. In addition, a second flange 42 having an annularly related edge strip 44 formed integrally thereon is provided. The portion 44 is likewise provided with grooves 46 defining an enlarged edge member which will also be forcibly slid lengthwise into another prepared groove in the wood member 2. In this form of the invention no screws or other similar fastening means are required to hold the extrusion to the wood strip.

Figure 4:
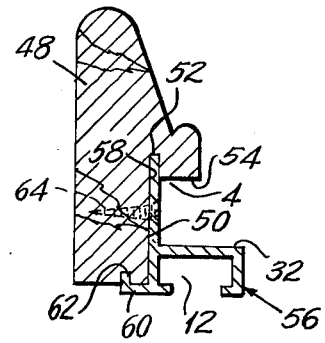

In the embodiment of FIG. 4, the wooden frame member 48 is provided with a rabbet similar to that previously described but its surface 50, corresponding to the surface 8 of FIG. 1, continues into the wood to form a groove or channel 52 projecting beyond the surface 54. The extrusion 56 again defines the undercut channel 12 and web 32, the flange 58 being of sufficient length to enter the groove 52 and the extrusion is provided with a further L-shaped flange 60, the free leg of which is caused to enter a second groove 62 in the wood member. If desired, screws 64 may be also employed to hold the extrusion to the wood strip or suitable adhesives may be used without requiring the screws 64.

While a limited number of specific embodiments have been shown and described, the same are merely to illustrate the principles of the invention and other forms may be resorted to within the scope of the appended claims.

1. A composite framing strip comprising:
   a strip of wood having a rabbet extending therealong and defining a pair of mutually perpendicular surfaces;
   an elongated extruded metal member defining an open undercut channel portion having a bottom web, said channel portion being positioned in said rabbet with its bottom web perpendicular to one of said surfaces and spaced from the other surface, the open side of said channel portion facing away from said other surface; and
   means fixedly securing said metal member to said strip of wood.

2. A framing strip as defined in claim 1 wherein said last-named means include an integral flange extending from said channel portion and abutting said one surface.

3. A framing strip as defined in claim 2 including fastening elements extending through said flange into said strip of wood.

4. A framing strip as defined in claim 2 wherein the edge of said flange extends into a longitudinal groove in said strip of wood at the juncture of said surfaces.

5. A framing strip as defined in claim 4 including a further flange integral with said channel portion generally perpendicular to said first-named flange and having an edge portion in a further groove in said strip of wood.

* * * * *